(12) United States Patent
Yang et al.

(10) Patent No.: US 9,003,046 B2
(45) Date of Patent: Apr. 7, 2015

(54) NETWORK ACCESS METHOD, TERMINAL DEVICE, SERVER, AND COMMUNICATION SYSTEM

(75) Inventors: Jian Yang, Beijing (CN); Shunan Fan, Beijing (CN); Lei Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 13/284,039

(22) Filed: Oct. 28, 2011

(65) Prior Publication Data
US 2012/0047275 A1    Feb. 23, 2012

Related U.S. Application Data

(63) Continuation of application No. PCT/CN2010/072269, filed on Apr. 28, 2010.

(30) Foreign Application Priority Data

Apr. 28, 2009   (CN) .......................... 2009 1 0135388

(51) Int. Cl.
    G06F 15/16    (2006.01)
    H04W 48/18    (2009.01)
    H04W 48/14    (2009.01)

(52) U.S. Cl.
    CPC .............. H04W 48/18 (2013.01); H04W 48/14 (2013.01)

(58) Field of Classification Search
    USPC ................... 709/227, 228, 229; 370/331, 401
    See application file for complete search history.

(56) References Cited

U.S. PATENT DOCUMENTS

| 7,400,593 | B2 * | 7/2008 | Choi et al. ................... 370/310 |
| 7,436,843 | B2 * | 10/2008 | Gustafsson et al. .......... 370/401 |
| 2004/0147266 | A1 * | 7/2004 | Hwang et al. ................. 455/445 |
| 2005/0083913 | A1 * | 4/2005 | Choi et al. ................... 370/352 |
| 2006/0084432 | A1 | 4/2006 | Balasubramanian et al. |
| 2006/0101185 | A1 * | 5/2006 | Kapoor et al. ................ 710/308 |
| 2010/0120410 | A1 | 5/2010 | Fan et al. |

FOREIGN PATENT DOCUMENTS

| CN | 1744744 A | 3/2006 |
| CN | 101035317 A | 9/2007 |

(Continued)

OTHER PUBLICATIONS

"GSM/GPRS Module"—Link Sprite, Sep. 2008 https://www.sparkfun.com/datasheets/Cellular%20Modules/CEL-09533-User's%20Manual.pdf.*

(Continued)

Primary Examiner — Randy Scott
(74) Attorney, Agent, or Firm — Leydig, Voit & Mayer, Ltd.

(57) ABSTRACT

A network access method, a terminal device, a server, and a communication system are provided. The method includes: querying corresponding parameters of connection according to a service type; and accessing a network by using the queried parameters of connection. Compared with the prior art in which the network is accessed by attempting to access one by one, the technical solution directly acquires correct parameters of connection for accessing the network without establishing a large number of redundant connection attempts, thereby greatly improving network access efficiency, reducing access time, decreasing a system load and network burden, and improving user experience.

5 Claims, 5 Drawing Sheets

---

B1 — The terminal device queries a connection profile corresponding to the service type B2 — The terminal device acquires the parameters of connection in the connection profile

(56) References Cited

FOREIGN PATENT DOCUMENTS

| CN | 101207924 A | 6/2008 |
|---|---|---|
| CN | 101355749 A | 1/2009 |
| WO | WO 2010/124632 A1 | 11/2010 |

OTHER PUBLICATIONS

English-translation of Second Chinese Office Action of Chinese Application No. 200910135388.5 mailed Apr. 20, 2012.

Written Opinion of the International Searching Authority related to Int'l Application No. PCT/CN2010/072269; filed Apr. 28, 2010; mailed Aug. 5, 2010 for Huawei Tech Co. Ltd., et al. (6 pgs.).

International Search Report related to Int'l Application No. PCT/CN2010/072269; filed Apr. 28, 2010; mailed Aug. 5, 2010 for Huawei Tech Co. Ltd., et al. (6 pgs.).

First Chinese Office Action (partial translation) of Chinese Application No. 200910135388.5; mailed Oct. 26, 2011 (6 pgs.).

Rejection Decision in corresponding Chinese Patent Application No. 200910135388.5 (Dec. 4, 2012).

\* cited by examiner

NETWORK ACCESS METHOD, TERMINAL DEVICE, SERVER, AND COMMUNICATION SYSTEM

CROSS-REFERENCE TO RELATED APPLICATIONS

This application is a continuation of International Application No. PCT/CN2010/072269, filed on Apr. 28, 2010, which claims priority to Chinese Patent Application No. 200910135388.5, filed on Apr. 28, 2009, both of which are hereby incorporated by reference in their entireties.

FIELD OF THE INVENTION

The present invention relates to the field of communications technologies, and in particular, to a network access method, a terminal device, a server, and a communication system.

BACKGROUND OF THE INVENTION

The General Packet Radio Service (GPRS) is a new packet data transmission technology activated on the existing Global System for Mobile Communications (GSM) network, and the GPRS is a packet switching technology relative to a routine circuit switching data transfer manner of the GSM accessed by dialing. The GPRS has advantages such as "always online", "easy switch", and "high-speed transmission", and may fully improve a mobile data communication service, so that a "Monternet" service becomes more abundant, and has more functions to implement services such as E-mail, electronic commerce, mobile office, chat online, information browse based on WAP, interactive games, FLASH pictures, polyphonic ringtones, terminal access of Personal Digital Assistance (PDA), and integrated location.

In the prior art, a method of accessing the GPRS network by a terminal device is as follows. A connection pool is established in the terminal, in which multiple parameters of connection for network access are recorded in the connection pool. During the network access, an application program that needs to access the network sends an access request to an access management module of the terminal, and an access control module attempts one by one according to each parameter of connection in the connection pool till the connection succeeds.

In the research and practice of the conventional art, the inventors of the present invention find that in the conventional art, the terminal performs connection attempts sequentially on all the parameters of connection in the connection pool; and for each access attempt, after the connection is established, a service connection needs to be established, and an access attempt on the next parameter of connection may be performed only after it is determined that a problem exists in the current connection when there is no response to the service connection, so that a large number of access attempts greatly increases access delay.

SUMMARY OF THE INVENTION

Embodiments of the present invention provide a network access method, a terminal device, a server, and a communication system, so as to improve network access efficiency of a terminal.

A network access method according to an embodiment of the present invention includes:

identifying a service type of a service;

querying corresponding parameters of connection according to the service type; and accessing a network according to the queried parameters of connection.

A network access method according to an embodiment of the present invention includes:

receiving a query request sent by a terminal device, in which the query request includes a service type;

querying corresponding parameters of connection according to the service type in the query request; and feeding the queried parameters of connection back to the terminal device.

A terminal device according to an embodiment of the present invention includes:

an identification unit, configured to identify a service type of a service;

a parameter of connection query unit, configured to query corresponding parameters of connection according to the service type; and an access control unit, configured to access a network according to the parameters of connection queried by the parameter of connection query unit.

A server according to an embodiment of the present invention includes:

a query request receiving unit, configured to receive a query request sent by a terminal device, in which the query request includes a service type;

a query unit, configured to query corresponding parameters of connection according to the service type in the query request; and a feedback unit, configured to feed the parameters of connection queried by the query unit back to the terminal device.

In the embodiments of the present invention, corresponding parameters of connection are queried according to the service type, and the network is accessed according to the queried parameters of connection. Compared with the conventional art in which the network is accessed by attempting to access one by one, correct parameters of connection for accessing the network are directly acquired without establishing a large number of redundant connection attempts, which thereby greatly improves the network access efficiency, reduces access time, decreases a system load and network burden, and improves user experience.

DETAILED DESCRIPTION OF THE EMBODIMENTS

Embodiments of the present invention provide a network access method, and a terminal device, a server, and a communication system corresponding to the network access method, which are described in detail below respectively.

Embodiment 1

Figure 1:
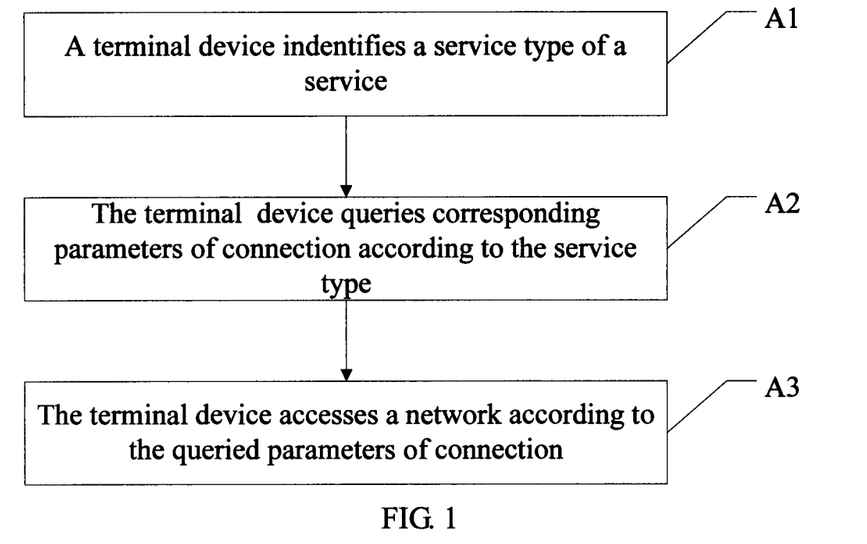
FIG. 1 is a flow chart of a network access method according to Embodiment 1 of the present invention.

A flow chart of a network access method is shown in FIG. 1, which includes the following steps;

A1: A terminal device identifies a service type of a service.

In an embodiment of the present invention, when an application program in a terminal requests to access a network, a service type corresponding to the application program may be identified, and a specific service type may be expressed as a service Identity (ID). It may be understood that the service type may also be expressed as an application ID or a Multipurpose Internet Mail Extensions (MIME) type. Specific expression manners of the service type may employ multiple definitions and implementations, but the present invention is not limited to the specific expression manners of the service type.

A2: The terminal device queries corresponding parameters of connection according to the service type.

The querying of the parameters of connection of the service type may be implemented by local querying and querying through a network. In this embodiment, mapping relations between the service type and the parameters of connection are emphasized, and a corresponding network access manner may be acquired according to the service type. Many specific query manners exist, and the present invention is not limited to the specific query manners.

In this embodiment, the parameters of connection may be a set of parameters by which the terminal device may access a network, for example, the set of parameters may includes access point information, proxy information, and connection type information.

A3: The terminal device accesses a network according to the queried parameters of connection.

A process for accessing the network by using the parameters of connection is a routine process, and is not described herein again.

In Embodiment 1 of the present invention, corresponding parameters of connection are queried according to the service type, and the network is accessed according to the queried parameters of connection. Compared with the prior art in which the network is accessed by attempting to access one by one, correct parameters of connection for accessing the network are directly acquired without establishing a large number of redundant connection attempts, which thereby greatly improves network access efficiency, reduces access time, decreases a system load and network burden, and improves user experience.

Hereinafter, a manner of querying the corresponding parameters of connection according to the service type is described with an example.

Embodiment 2

Figure 2:
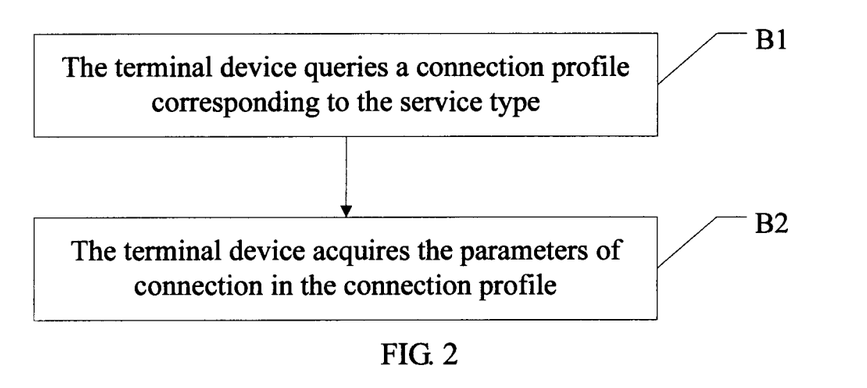
FIG. 2 is a flow chart of querying parameters of connection corresponding to a service type in a local network connection configuration database according to Embodiment 2 of the present invention.

The process for querying parameters of connection according to a service type in a local network connection configuration database is as shown in FIG. 2, which includes specifically the following steps.

B1: The terminal device queries a connection profile corresponding to the service type.

The parameters of connection available to the terminal are configured in a database which may be represented by a list, for example, a connection profile list is preset, and a service ID corresponds to a connection profile in the connection profile list.

For local query, a terminal side may save the one-to-one mapping relation between the service type and the connection profile, as shown in FIG. 1.

TABLE 1

| | |
|---|---|
| Short message service | Connection profile 1 |
| Multimedia service | Connection profile 2 |
| Data transmission service | Connection profile 3 |

B2: The terminal device acquires the parameters of connection in the connection profile.

In the connection profile, a basic parameter of connection for network connection are defined, specific parameters of connection are not fixed, which correlate with a network type and architecture, and different service types and network architecture may have different requirements for the parameters of connection. Description is made with an example below:

The parameters of connection may include a connection type parameter, a connection attribute parameter, and a proxy attribute parameter.

The connection type parameter is used to indicate the connection type, for example, GPRS represents that the connection is GPRS access; Code Division Multiple Access (CDMA) represents that the connection is CDMA access; Wireless Local Area Network (WLAN) represents that the connection is Wireless Fidelity (WiFi) access; Local Area Network (LAN) represents that the connection is LAN access; Worldwide interoperability for Microwave Access (WiMax) represents that the connection is WiMax access; and Broadcast (BCAST) represents that the connection is BCAST access. It should be understood that, the connection type parameter in the embodiment of the present invention includes, but is not limited to, the foregoing connection types.

The connection attribute parameter is used to indicate connection attribute information of a designated connection type access. For example, if the connection attribute parameter is GPRS, the attribute is GPRS related series connection attribute information, for example, Access Point Name (APN); while if the connection attribute parameter is WLAN, it represents WiFi related series access attribute information, for example, APN.

The proxy attribute parameter is used to indicate whether a proxy is needed by the connection, and if the connection does not need a proxy, it indicates that there is no proxy setting; while if the connection needs a proxy, it represents proxy attribute related information of the current connection, for example, information such as a proxy address, a proxy port, a proxy name, and a proxy password.

It may be understood that, in the embodiment of the present invention, multiple parameters of connection may be configured in the connection profile corresponding to the service type, each of the parameters of connection may provide a corresponding access service for the service type, and the configuration of multiple connection attribute information may achieve a backup of a connection manner. When default network connection information may not achieve the access, other backup connection attribute information may be attempted for network access, and specifically, priorities may be configured for multiple connection attributes, and limited connection ranking may be performed according to the priorities.

Embodiment 3

Figure 3:
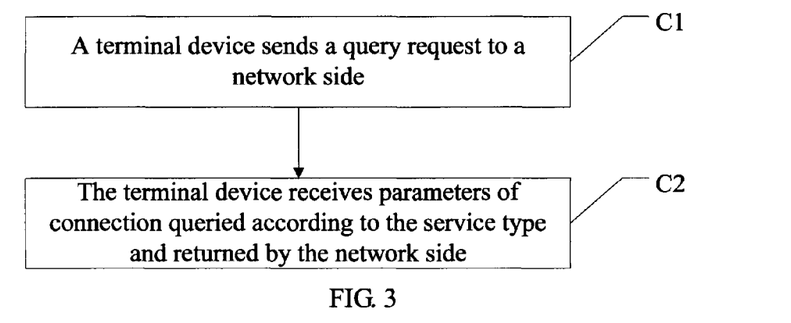
FIG. 3 is a flow chart of querying parameters of connection corresponding to a service type through a network according to Embodiment 3 of the present invention.
Figure 4:
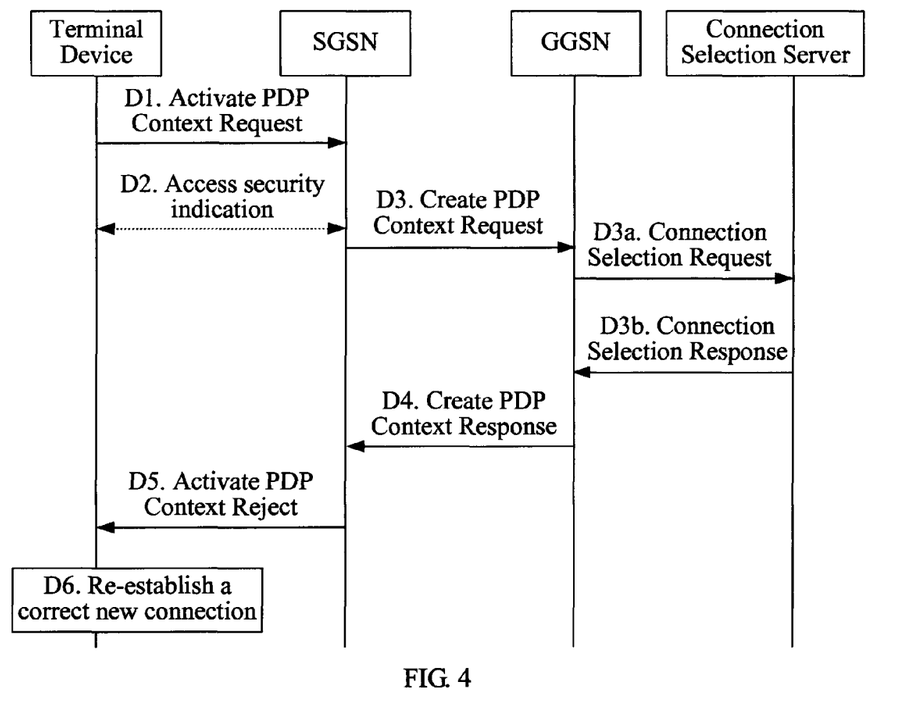
FIG. 4 is a signaling flow chart of Application Example 1 in Embodiment 3 of the present invention.

The process for querying parameters of connection corresponding to a service type through a network is shown in FIG. 3, which includes specifically the following steps:

C1: A terminal device sends a query request to a network side, in which the query request includes the service type.

The query request sent by the terminal device may be sent by using default parameters of connection.

C2: The terminal device receives parameters of connection queried according to the service type and returned by the network side.

Correspondingly, a network side server processes a query request from a user, and a network side server needs to receive the query request sent by the terminal device, in which the query request includes the service type; queries corresponding parameters of connection according to the service type in the query request; and feeds the queried parameters of connection back to the terminal device.

In this embodiment, the acquiring of the parameters of connection may be implemented through multiple communication manners, and a process for acquiring the parameters of connection through a network is described with application examples.

Application Example 1

A signaling flow chart of a process for querying parameters of connection corresponding to a service type through a network over the GPRS Protocol is shown in FIG. 3. Network entities referred to below are only common network entities for implementing the technical solution of the present invention over the GPRS protocol, and do not cause limitations to the present invention.

The specific process includes the following steps:

D1: Prepare to establish a Packet Switched (PS) domain connection when a terminal Mobile Station (MS) has a service to be initiated, and send an Activate PDP Context Request message to a Service GPRS Support Node (SGSN), in which the message carries a service ID. The service ID may be carried in a PDP Configuration Options parameter domain in the message.

D2: Perform access security indication, and this step is an optional routine manner.

D3: The SGSN sends a Create PDP Context Request message carrying the service ID to a Gateway GPRS Support Node (GGSN).

D3a: The GGSN finds that the service ID is carried after receiving the Create PDP Context Request message, and then sends a Connection Selection Request message carrying the service ID to a connection selection server.

D3b: After receiving the Connection Selection Request message, the connection selection server searches parameters of connection corresponding to the service ID, and returns the parameters of connection to the SGSN through a Connection Selection Response message.

D4: After receiving the response message, the SGSN checks the parameters of connection. If the SGSN finds that the connection is not the same as the current connection, the SGSN accordingly sends the parameters of connection to the GGSN through a Create PDP Context Response message, and expresses that the current connection request is rejected.

D5: The SGSN sends an Activate PDP Context Reject message carrying information about the parameters of connection to the terminal.

D6: The terminal MS re-establishes a correct new connection according to the parameters of connection.

Application Example 2

Figure 5:
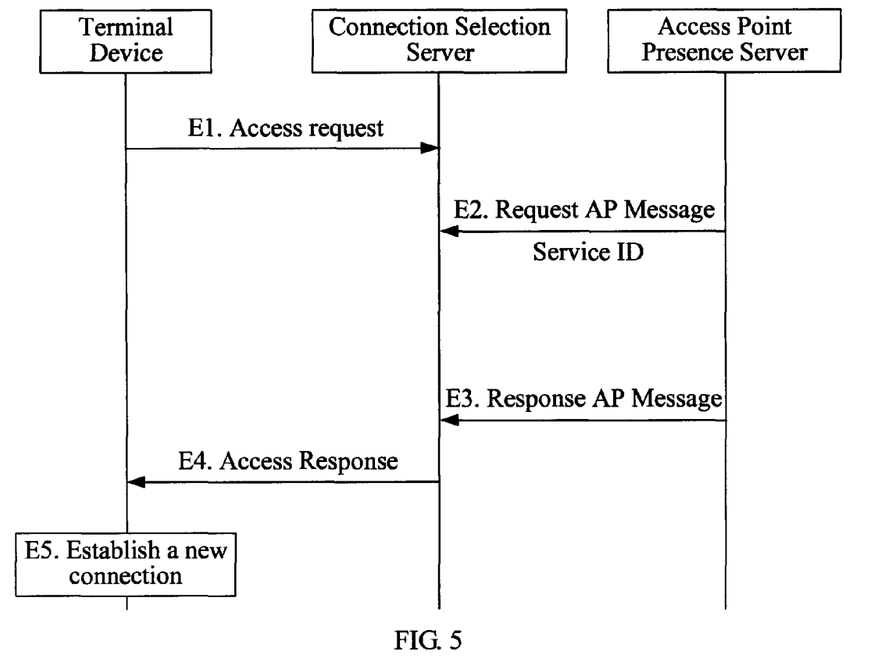
FIG. 5 is a signaling flow chart of Application Example 2 in Embodiment 3 of the present invention.

In this example, a specific process for acquiring parameters of connection by using application protocol signaling on a service layer, in which the parameters of connection refer to access point information for terminal access, is shown in FIG. 5, which includes the following steps:

E1: A terminal sends an access request to a connection selection server through a default network connection, to request for correct connection access information of a current service, in which the access request carries a service ID.

In the embodiment of the present invention, the connection selection server, through a server for connection control management, is configured to guide the terminal to access a correct access point, so that a terminal service may be effectively accessed to a correct connection service.

E2: After receiving the request, the connection selection server sends a Request AP Message carrying the service ID to an access point presence server.

In the embodiment of the present invention, the access point presence server may query correct network access point information of the current service available to the current user, and manage a mapping relation between the terminal service and the access point information.

E3: The access point presence server queries the AP information corresponding to the service ID, and sends the queried AP information to the connection selection server through a Response AP Message.

E4: The connection selection server sends the AP information to the terminal device through an Access Response message.

E5: The terminal device establishes a new connection according to the received AP information.

In this embodiment, the connection selection server and the access point presence server may be integrated together.

In the embodiment of the present invention, the locally querying the parameters of connection and the querying the parameters of connection through a network may be used in combination. For example, if the parameters of connection corresponding to the service type are not found in a local network connection configuration database, the query request is sent to the server by using default parameters of connection, in which the query request includes the service type, and the queried parameters of connection corresponding to the service type returned by the server are received. For the specific querying of the parameters of connection through a network, reference may be made to Embodiment 3 and the corresponding methods in Application Examples 1 and 2.

Application Example 3

Figure 6:
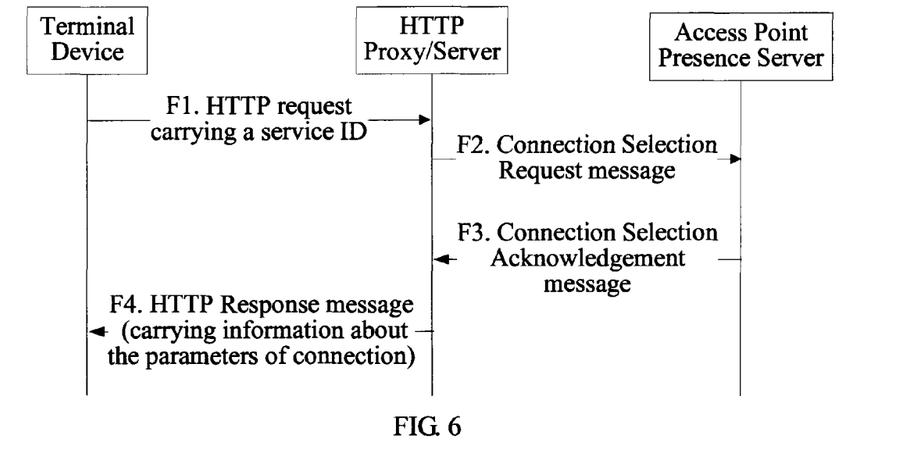
FIG. 6 is a signaling flow chart of Application Example 3 in Embodiment 3 of the present invention.

A user may acquire parameters of connection by carrying a service ID in an HTTP protocol at an application layer. A specific signaling process is shown in FIG. 6, which includes the following steps:

F1: A terminal device sends an HTTP request carrying a service ID to an HTTP proxy/server.

F2: The HTTP proxy/server sends a Connection Selection Request message carrying the service ID to the access point presence server.

F3: The access point presence server queries parameters of connection corresponding to the service ID, and returns the queried parameters of connection to the HTTP proxy/server through a Connection Selection Acknowledgement message.

F4: The HTTP proxy/server feeds the parameters of connection back to the terminal device through an HTTP Response message.

Application Example 4

Figure 7:
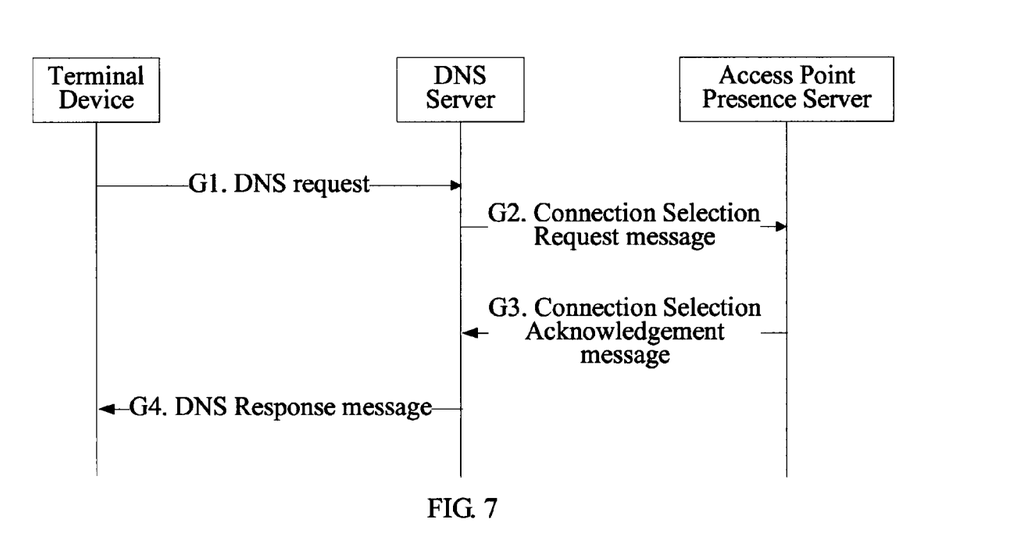
FIG. 7 is a signaling flow chart of Application Example 4 in Embodiment 3 of the present invention.

After accessing an Internet Protocol (IP) network, a user may send a Domain Name System (DNS) request carrying a service ID to a DNS server through a DNS client program in a terminal, so as to implement the function of acquiring parameters of connection. A specific signaling process is shown in FIG. 7, which includes the following steps:

G1: A terminal device sends a DNS request carrying a service ID to a DNS server.

G2: The DNS server sends a Connection Selection Request message carrying the service ID to an access point presence server.

G3: The access point presence server queries the parameters of connection corresponding to the service ID, and returns the queried parameters of connection to the DNS server through a Connection Selection Acknowledgement message.

G4: The DNS server feeds the parameters of connection back to the terminal device through a DNS response message.

In Application Examples 1, 2, and 3, the GPRS protocol, application layer protocol, and HTTP protocol are respectively adopted to acquire the parameters of connection. Compared with the prior art in which the network is accessed by attempting to access one by one, correct parameters of connection for accessing the network are directly acquired without establishing a large number of redundant connection attempts, which thereby greatly improves network access efficiency, reduces access time, decreases a system load and network burden, and improves user experience.

Persons skilled in the art should understand that all or a part of the steps of the methods according to the embodiments may be implemented by a program instructing relevant hardware. The program may be stored in a computer readable storage medium. The storage medium may include a ROM, a RAM, a magnetic disk, or an optical disk.

Hereinafter, a terminal device and a server according to embodiments of the present invention are described below.

Embodiment 4

Figure 8:
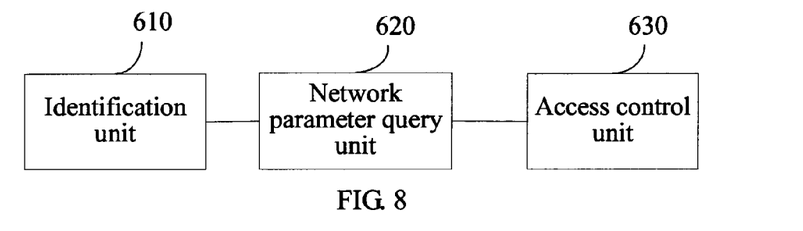
FIG. 8 is a schematic structural diagram of a terminal device according to Embodiment 4 of the present invention.

A schematic structural diagram of a terminal device is shown in FIG. 8, which includes an identification unit 610, a parameter of connection query unit 620, and an access control unit 630.

The identification unit 610 is configured to identify a service type of a service.

The parameter of connection query unit 620 is configured to query corresponding parameters of connection according to the service type.

The access control unit 630 is configured to access a network according to the queried parameters of connection.

Figure 9:
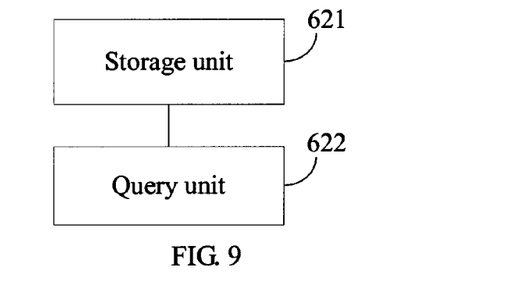
FIG. 9 is a schematic diagram of an internal structure of a parameter of connection query unit according to Embodiment 4 of the present invention.

In the embodiment of the present invention, as shown in FIG. 9, the parameter of connection query unit 620 may include a storage unit 621 and a query unit 622.

The storage unit 621 is configured to save the parameters of connection corresponding to each service type.

The query unit 622 is configured to query the parameters of connection corresponding to the service type identified by the identification unit in the storage unit.

Embodiment 5

Figure 10:
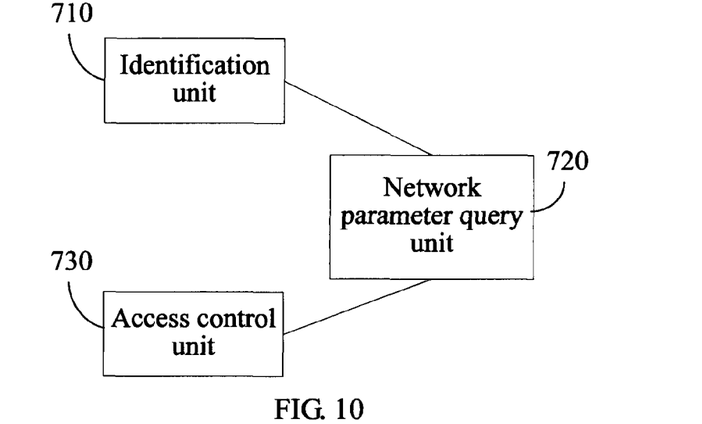
FIG. 10 is a schematic structural diagram of a terminal device according to Embodiment 5 of the present invention.

A schematic structural diagram of a terminal device is shown in FIG. 10, which includes an identification unit 710, a parameter of connection query unit 720, and an access control unit 730.

The identification unit 710 is configured to identify a service type of a service.

The parameter of connection query unit 720 is configured to query corresponding parameters of connection according to the service type.

The access control unit 730 is configured to access a network according to the queried parameters of connection.

Figure 11:
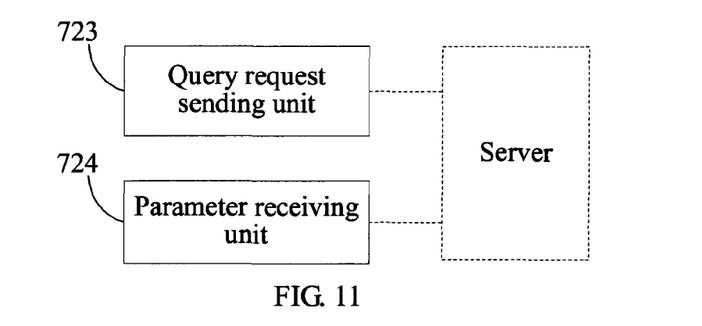
FIG. 11 is a schematic diagram of an internal structure of a parameter of connection query unit according to Embodiment 5 of the present invention.

In the embodiment of the present invention, as shown in FIG. 11, the parameter of connection query unit 720 may include a query request sending unit 723 and a parameter receiving unit 724.

The query request sending unit 723 is configured to send a query request to a server, in which the query request includes the service type, and the query request sending unit 723 may send the query request to the server by using default parameters of connection.

The parameter receiving unit 724 is configured to receive the queried parameters of connection returned by the server.

Embodiment 6

Figure 12:
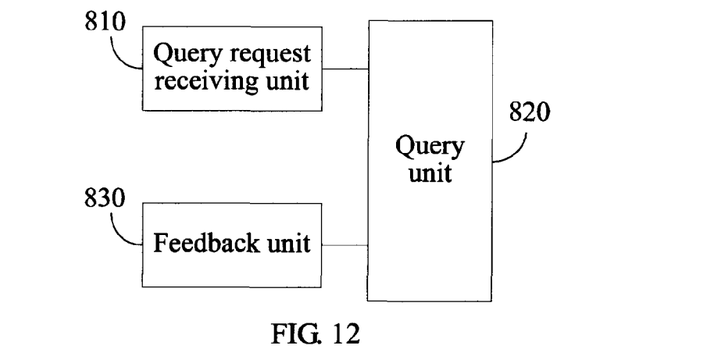
FIG. 12 is a schematic structural diagram of a server according to Embodiment 6 of the present invention.
Figure 13:
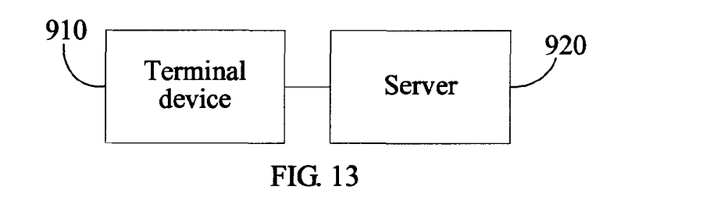
FIG. 13 is a schematic structural diagram of a communication system according to Embodiment 7 of the present invention.

A schematic structural diagram of a server is shown in FIG. 12, which includes a query request receiving unit 810, a query unit 820, and a feedback unit 830.

The query request receiving unit 810 is configured to receive a query request sent by a terminal device by using default parameters of connection, in which the query request includes a service type.

The query unit 820 is configured to query corresponding parameters of connection according to the service type in the query request.

The feedback unit 830 is configured to feed the parameters of connection queried by the query unit 820 back to the terminal device.

Embodiment 7

A schematic structural diagram of a communication system is shown in FIG. 9, which includes a terminal device 910 and a server 920.

The terminal device 910 is configured to send a query request to the server 920, in which the terminal device 910 may send the query request to the server 920 by using default parameters of connection, and the query request includes a service type; receive queried parameters of connection returned by the server, and access a network according to the queried parameters of connection.

The server 920 is configured to receive the query request sent by the terminal device 910, query the corresponding parameters of connection according to the service type in the query request, and feed the parameters of connection queried by a query unit back to the terminal device 910.

The network access method, the terminal device, the server, and the communication system according to the embodiments of the present invention are described above in detail.

In the embodiments of the present invention, the corresponding parameters of connection are queried according to the service type, and the network is accessed according to the queried parameters of connection. Compared with the prior art in which the network is accessed by attempting to access one by one, correct parameters of connection for accessing the network are directly acquired without establishing a large number of redundant connection attempts, which thereby greatly improves network access efficiency, reduces access time, decreases a system load and network burden, and improves user experience.

The principle and implementation of the present invention are described herein through specific examples. The description about the embodiments of the present invention is merely provided for better understanding the method and core idea of the present invention. Persons skilled in the art may make variations and modifications to the present invention in terms of the specific implementations and application scopes according to the idea of the present invention. Therefore, the specification shall not be construed as a limit to the present invention.

What is claimed is:

1. A method of accessing a GPRS network, implemented by a terminal device, comprising:
    Identifying, by the terminal device, a service type of a service, wherein the service type can be represented as an application ID or a Multipurpose Internet Mail Extensions (MIME) type;
    sending, by the terminal device, a request message to a Service GPRS Support Node (SGSN) for querying a parameter of connection corresponding to the service type if the parameter of connection corresponding to the service type are not found at the terminal device, wherein the parameter of connection includes a connection type parameter which is used to indicate a connection type, or a connection attribute parameter which is used to indicate connection attribute information of a designated connection type access, or a proxy attribute parameter which is used to indicate whether a proxy is needed by the connection; and
    accessing, by the terminal device, a network according to the parameter of connection returned by the SGSN.

2. The method according to claim 1, wherein the request message is sent through a packet domain access request message, a HyperText Transfer Protocol (HTTP) request message, or a Domain Name System (DNS) request message.

3. A terminal device having a Central Processing Unit (CPU), wherein the CPU comprises:
    an identification unit, configured to identify a service type of a network service, wherein the service type can be represented as an application ID or a Multipurpose Internet Mail Extensions (MIME) tyke;
    a parameter of connection query unit, configured to send a request message to a Service GPRS Support Node (SGSN) for querying a parameter of connection corresponding to the service type if the parameter of connection corresponding to the service type is not found at the terminal device, wherein the parameter of connection includes a connection type parameter which is used to indicate a connection type, or a connection attribute parameter which is used to indicate connection attribute information of a designated connection type access, or a proxy attribute parameter which is used to indicate whether a proxy is needed by the connection; and
    an access control unit, configured to access a network according to the parameter of connection returned by the SGSN.

4. The terminal device according to claim 3, wherein the parameter of connection query unit comprises:
    a storage unit, configured to save a parameter of connection corresponding to each service type; and
    a query unit, configured to query a parameter of connection corresponding to the service type identified by the identification unit in the storage unit.

5. The terminal device according to claim 3, further comprising:
    a query request sending unit, configured to send a request message to a network server by using a default parameter of connection, wherein the request message comprises the service type; and
    a parameter receiving unit, configured to receive the queried parameter of connection returned by the network server.

\* \* \* \* \*

UNITED STATES PATENT AND TRADEMARK OFFICE
CERTIFICATE OF CORRECTION

PATENT NO. : 9,003,046 B2  Page 1 of 1
APPLICATION NO. : 13/284039
DATED : April 7, 2015
INVENTOR(S) : Yang et al.

It is certified that error appears in the above-identified patent and that said Letters Patent is hereby corrected as shown below:

In the claims,

Column 10, Claim 3, line 6, "tyke" should read -- type --.

Signed and Sealed this
Twenty-fourth Day of November, 2015

Michelle K. Lee
*Director of the United States Patent and Trademark Office*